U S009036212B2

(12) United States Patent
Chandu et al.

(10) Patent No.: US 9,036,212 B2
(45) Date of Patent: *May 19, 2015

(54) HALFTONE SCREEN GENERATION MECHANISM

(75) Inventors: Kartheek Chandu, Longmont, CO (US); Mikel Stanich, Longmont, CO (US); Chai Wah Wu, Hopewell Junction, NY (US); Barry M. Trager, Yorktown Heights, NY (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 438 days.

This patent is subject to a terminal disclaimer.

(21) Appl. No.: 13/345,466

(22) Filed: Jan. 6, 2012

(65) Prior Publication Data

US 2013/0176599 A1 Jul. 11, 2013

(51) Int. Cl.
*H04N 1/405* (2006.01)
*H04N 1/40* (2006.01)
*G06K 15/00* (2006.01)

(52) U.S. Cl.
CPC ......... *H04N 1/4051* (2013.01); *H04N 1/40087* (2013.01)

(58) Field of Classification Search
USPC ......... 358/3.06, 3.01, 3.3, 501, 512, 534, 536
See application file for complete search history.

(56) References Cited

U.S. PATENT DOCUMENTS

| 5,805,734 | A | 9/1998 | Ebner |
| 5,923,774 | A | 7/1999 | Ostronmoukhov |
| 6,563,957 | B1* | 5/2003 | Li et al. ..................... 382/252 |
| 6,791,718 | B1 | 9/2004 | Allebach et al. |
| 6,917,443 | B1 | 7/2005 | Wang |
| 7,277,204 | B2 | 10/2007 | Krol et al. |
| 7,446,904 | B2 | 11/2008 | Stanich et al. |
| 7,453,604 | B2 | 11/2008 | Eschbach et al. |
| 7,460,276 | B2 | 12/2008 | Xu et al. |
| 7,593,135 | B2 | 9/2009 | Luo et al. |
| 7,911,646 | B2 | 3/2011 | Chang |
| 8,610,962 | B2 | 12/2013 | Fischer et al. |
| 2004/0169872 | A1 | 9/2004 | Maurer |
| 2004/0233477 | A1 | 11/2004 | Stanich et al. |
| 2009/0046850 | A1 | 2/2009 | Au et al. |
| 2009/0097052 | A1 | 4/2009 | Kawamura |
| 2010/0033764 | A1 | 2/2010 | Guo et al. |

(Continued)

OTHER PUBLICATIONS

"PCT Search Report and Written Opinion", PCT/US12/71516, (Mar. 13, 2013), 9 pages.
Lee, Changhyung , et al., "The Hybrid Screen—Improving the Breed", *IEEE 1057-7149*, (2010), 435-450.
Gooran, Sasan, "A Novel Hybrid Amplitude Modulated/Frequency Modulated Halftoning Based on Multilevel Halftoning", Journal of Imaging Science and Technology, vol. 50, No. 2, (Apr. 2006), 1-25.

(Continued)

*Primary Examiner* — Quang N Vo
(74) *Attorney, Agent, or Firm* — Blakely, Sokoloff, Taylor & Zafman LLP

(57) ABSTRACT

A method is disclosed. The method includes generating a Continuous Tone Image (CTI) with all pixel values same as the first gray level and an initial Half Tone Image (HTI) with all pixel values equal to minimum absorptance level, computing a change in pixel error by toggling with all the possible output states and swapping with all neighbor pixels only if the stacking constraint is satisfied, updating the HTI with the maximum error decrease operation and continue to next pixel location till the end criteria is met. Once the end criteria is met, the updated HTI is saved as a final halftone screen for that gray level and copied as the initial HTI for the next gray level along with CTI pixel values updated to the next gray level till the final gray value is reached.

17 Claims, 6 Drawing Sheets

(56) References Cited

U.S. PATENT DOCUMENTS

| | | | |
|---|---|---|---|
| 2010/0045722 A1* | 2/2010 | Chandu et al. | 347/15 |
| 2011/0141525 A1 | 6/2011 | Ng et al. | |
| 2011/0142340 A1 | 6/2011 | Guo et al. | |
| 2012/0182587 A1* | 7/2012 | Shacham et al. | 358/3.06 |
| 2013/0201528 A1 | 8/2013 | Morisse | |

OTHER PUBLICATIONS

Allebach, Jan, "DBS: retrospective and future directions", Proceedings of SPIE, vol. 4300 (2001)., 358-376.

Bhatt, Sagar, et al., "Dietary Binary Search with Adaptive Search and Swap", (Aug. 10, 2005), 1-9.

\* cited by examiner

HALFTONE SCREEN GENERATION MECHANISM

FIELD OF THE INVENTION

The invention relates to the field of image reproduction, and in particular, to digital halftoning.

BACKGROUND

Digital halftoning is a technique for displaying a picture on a two-dimensional medium, in which small dots and a limited number of colors are used. The picture appears to consist of many colors when viewed from a proper distance. For example, a picture consisting of black and white dots can appear to display various gray levels. Digital printers, which were initially pure black and white machines with a very coarse resolution, have evolved to accommodate colors, finer resolutions, and more recently, more than one bit of information per pixel (referred to as "multi-bit" or "multi-tone").

Screening is a type of halftoning method used commonly in practical implementations. A common binary screening method employs a matrix of thresholds replicated to the size of printable area. These replicated matrices are compared to the Continuous Tone Image (CTI) to determine which PELs are ON or OFF. The print controller receives a CTI, such as a digital picture, from a host. The print controller then uses the screening algorithm to process the CTI and convert the image into an array of pixels. The result of the screening algorithm is a bitmap where each pixel may be ON or OFF which is referred to as a Half-Tone Image (HTI). The print controller then sends the HTI to a print engine for printing.

With the prevalence of devices having multi-bit capability there is a potential to improve overall image quality of print jobs using multi-bit halftoning. Multi-bit screening enables a selection among multiple drop sizes or exposure levels at each addressable pixel. The multi-bit screen consists of array of thresholds for every drop size or exposure level. Another way of representing this screen is a Look-Up Table (LUT) which is a 3D array having planes representing each darker gray level, ranging from the pattern for gray level zero through the maximum gray level of the halftone mask. The maximum gray level is used to produce a solid, where all of the pixels are printed at the maximum output state.

Several single bit halftone screen algorithms are available that may be extended to multi-bit applications in order to produce high quality halftone images. For example, the article "Multilevel Screen Design Using Direct Binary Search," (G. Lin and J. P. Allebach) Journal of the Optical Society of America, A19, 1969-1982 (2002) demonstrate the extension of single bit screening algorithm to multi-bit using DBS with the help of schedulers. However, these algorithms require many parameters to guide through the multi-bit screen creation.

Accordingly, an algorithm to efficiently create multi-bit halftone screen is desired.

SUMMARY

In one embodiment, a method is disclosed. The method includes generating a Continuous Tone Image (CTI) with all pixel values same as the first gray level and an initial Half Tone Image (HTI) with all pixel values equal to minimum absorptance level, computing a change in pixel error by toggling with all the possible output states and swapping with all neighbor pixels only if the stacking constraint is satisfied, updating the HTI with the maximum error decrease operation and continue to next pixel location till the end criteria are met.

BRIEF DESCRIPTION OF THE DRAWINGS

A better understanding of the present invention can be obtained from the following detailed description in conjunction with the following drawings, in which.

DETAILED DESCRIPTION

A direct multi-bit search screen mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
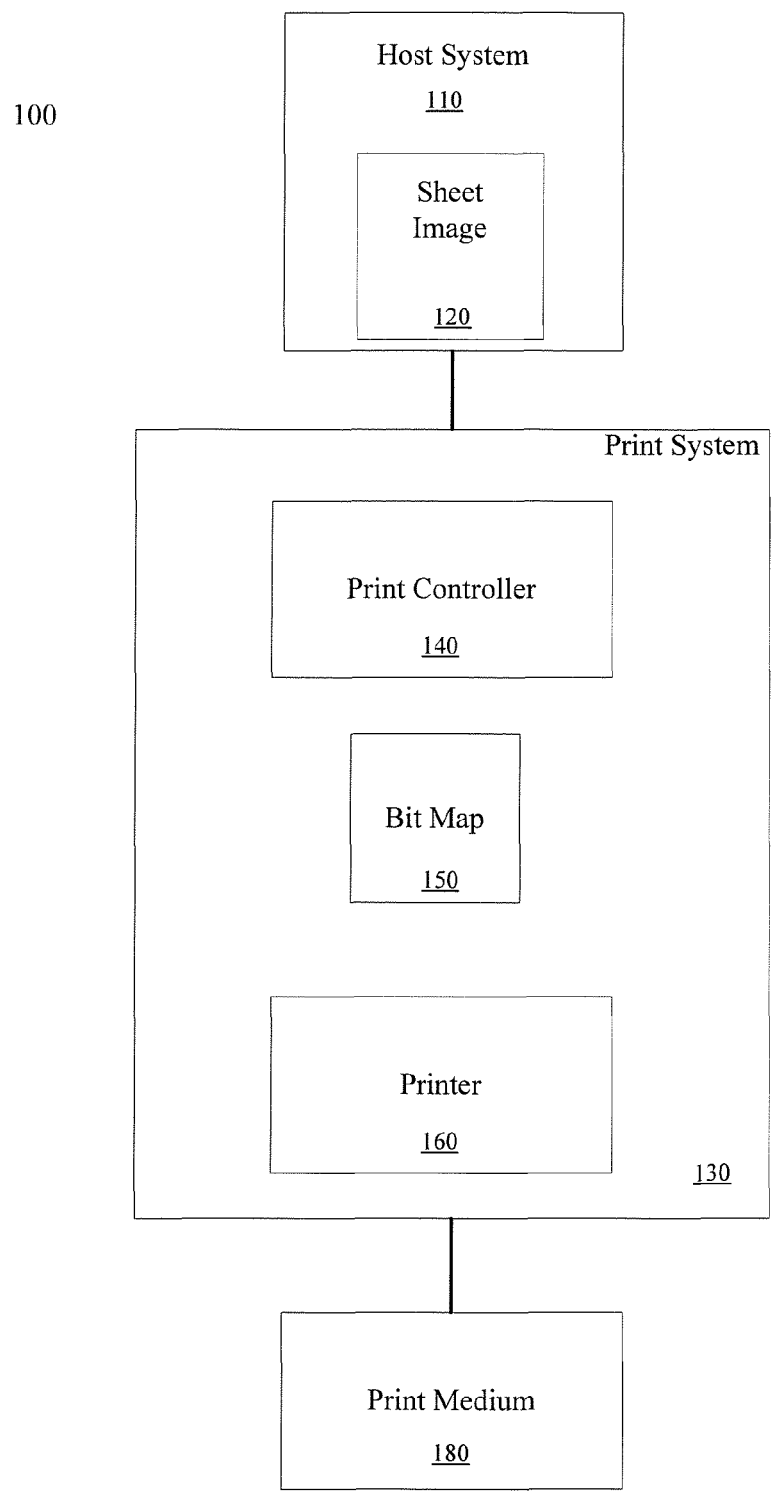
FIG. 1 illustrates one embodiment of a printing network.

FIG. 1 is a block diagram illustrating a printing network 100. Network 100 includes a host system 110 in communication with a printing system 130 to print a sheet image 120 onto a print medium 180 (e.g., paper) via a printer 160. The resulting print medium 180 may be printed in color and/or in any of a number of gray shades, including black and white.

The host system 110 may include any computing device, such as a personal computer, a server, or even a digital imaging device, such as a digital camera or a scanner. The sheet image 120 may be any file or data that describes how an image on a sheet of print medium should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160.

The printing system 130 may be a high-speed printer operable to print relatively high volumes (e.g., greater than 100 pages per minute). The print medium 180 may be continuous form paper, cut sheet paper, and/or any other tangible medium suitable for printing. In one embodiment, the printing system 130 includes the printer 160 that presents the bitmap 150 onto the print medium 180 (e.g., via toner, ink, etc.) based on the sheet image 120.

Figure 2:
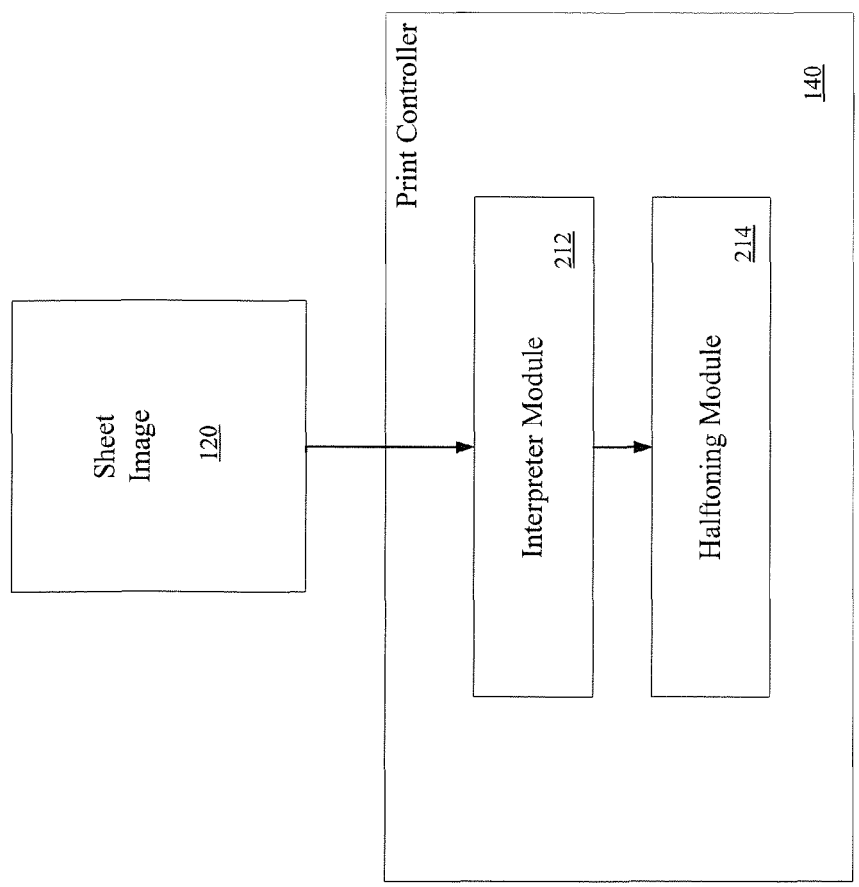
FIG. 2 illustrates one embodiment of a print controller.

The print controller 140 may be any system, device, software, circuitry and/or other suitable component operable to transform the sheet image 120 for generating the bitmap 150 in accordance with printing onto the print medium 180. FIG. 2 is a block diagram illustrating an exemplary print controller 140.

Referring to FIG. 2, the print controller 140, in its generalized form, includes an interpreter module 212 and a halftoning module 214. In one embodiment, these separate components represent hardware used to implement the print controller 102. Alternatively or additionally, the components may represent logical blocks implemented by executing software instructions in a processor of the printer controller 140. Accordingly, the invention is not intended to be limited to any particular implementation as such may be a matter of design choice.

The interpreter module 212 is operable to interpret, render, rasterize, or otherwise convert images (i.e., raw sheetside images such as sheet image 120) of a print job into sheetside bitmaps. The sheetside bitmaps generated by the interpreter module 212 are each a two-dimensional array of pixels representing an image of the print job e.g., a continuous tone image (CTI), also referred to as full sheetside bitmaps.

The two-dimensional pixel arrays are considered "full" sheetside bitmaps because the bitmaps include the entire set of pixels for the image. The interpreter module 212 is operable to interpret or render multiple raw sheetsides concurrently so that the rate of rendering substantially matches the rate of imaging of production print engines.

Halftoning module 214 is operable to represent the sheetside bitmaps as patterns of ink drops or other dots, having one or more different drop of dot sizes. For example, the halftoning module 214 may convert the continuous tone sheetside bitmaps to a pattern of ink drops for application to the print medium 180 (e.g., paper). Once computed, the halftoning module 214 transfers the converted sheetside bitmaps to the print head controllers of the printer 160 to apply the ink drop(s) to the tangible medium 180.

According to one embodiment, halftoning module 214 performs halftoning using a screen generated via a Direct Multi-bit Search Screen Algorithm (DMSSA). In such an embodiment, the DMSSA optimizes a halftone pattern at each gray level using a Human Visual System or other suitable filter and selects from among multiple drop sizes that printer 160 is capable of applying to the tangible medium 180. In a further embodiment, the DMSSA screen is generated at host system 100 or another host system in printing network 100. However, the mask may be generated at a third party computer system and transferred to printing network 100.

In one embodiment, the DMSSA is based on the Direct Multi-bit Search (DMS) algorithm which is an extension to Direct Binary Search (DBS) algorithm. The DMS algorithm is an iterative/recursive search heuristic that uses a perceptual filter, such as a HVS model, to minimize the perceived error difference ($\epsilon$), between a continuous tone image (CTI) and its corresponding rendered halftone image (HTI). This error is represented as:

$\epsilon = |h(x,y)g(x,y) - h(x,y)f(x,y)|^2$ dxdy, where ** denotes 2-dimensional convolution, $h(x,y)$ represents the point spread function (PSF) of the human visual system or other suitable filtering function, $f(x,y)$ is the continuous tone original image and $g(x,y)$ is the halftone image corresponding to the original image, where all image values are assumed to lie between 0 (white) and 1 (black).

The halftone image $g(x,y)$ itself incorporates a printer model. $g(x,y) = \Sigma_m \Sigma_n g[m,n] p(x-mX, y-nX)$, which represents the combination of the digital halftone image $g[m,n]$ with a spot profile $p(x,y)$ having device PEL spacing X, where X is the inverse of the printer addressability DPI. Superposition is assumed in this model for the interaction between overlapping spots. The digital halftone image $g[m,n]$ can have any absorptance value between 0 (white) and 1 (black).

DMS is a computationally expensive algorithm that requires several passes through the halftone image (HTI) before converging to the final HTI. The DMS algorithm starts by generating an initial halftone image, then a local improvement to the halftone image is produced by swapping and toggling, ultimately resulting in an optimized halftone image by selecting the most appropriate swaps and toggles. Where swapping is the operation of switching the absorptance values of nearby pixels and toggling is the operation of changing the absorptance value of individual pixels.

The cost function may be represented as $\epsilon = \langle \tilde{e}, \tilde{e} \rangle$, where $\langle .,. \rangle$ denotes the inner product and $\tilde{e}(x,y) = h(x,y)*(g(x,y)-f(x,y))$ represents the perceptually filtered error. In such an embodiment, the CTI $f(x,y)$ may also be expressed in terms of its samples $f[m,n]$ where $(m,n)$ are coordinate on the halftone array or printer grid. Thus, the perceived error is given by $\tilde{e}(x,y) = \Sigma_{m,n} e[m,n] \tilde{p}(x-mX, y-nX)$, where $e[m,n] = g[m,n] - f[m,n]$, and $\tilde{p}(x,y) = h(x,y)**p(x,y)$ is the perceived printer spot profile.

Considering the effect of a trial change. The new error will be $\tilde{e}' = \tilde{e} + \Delta\tilde{e}$. Substituting this and expanding the inner product results in $\epsilon' = \epsilon + 2\langle \Delta\tilde{e}, \tilde{e} \rangle + \langle \Delta\tilde{e}, \Delta\tilde{e} \rangle$, assuming all signals are real-values. Either a toggle at pixel $(m_0, n_0)$ or a swap between pixels $(m_0, n_0)$ and $(m_1, n_1)$ can be represented as $g'[m,n] = g[m,n] + \Sigma_i a_i \delta[m-m_i, n-n_i]$. As a result, $\Delta \tilde{e}(x,y) = \Sigma_i a_i \tilde{p}(x - m_i X, y - n_i X)$, and $\Delta \epsilon = 2 \Sigma_i c \widetilde{pe} [m_i, n_i] + \Sigma_{i,j} a_i a_j c \widetilde{pp} [m_i - m_j, n_i - n_j]$, where $c \widetilde{pe} [m,n] = \langle \tilde{p}(x,y), \tilde{e}(x + mX, y + nX) \rangle$, and $c \widetilde{pp} [m,n] = \langle \tilde{p}(x,y), \tilde{p}(x + mX, y + nX) \rangle$.

According to one embodiment, a richer class of HVS model is implemented that yields enhanced halftoning results. This model is based on mixed Gaussian functions whose functional form is:

$c \widetilde{pp} [u, v] = k_1 \exp(-(u^2+v^2)/2\sigma_1^2) + k_2 \exp(-(u^2+v^2)/2\sigma_2^2)$, where the constants k1; k2; $\sigma_1$; $\sigma_2$ are the values 43.2, 38.7, 0.02, 0.06 respectively. Assuming that $c \widetilde{pp}$ is symmetric, then:

$\Delta \epsilon = 2(\Sigma_i c \widetilde{pe} [m_i, n_i] + \Sigma_{i<j} a_i a_j c \widetilde{pp} [m_i - m_j, n_i - n_j]) + \Sigma_i a_i^2 c \widetilde{pp} [0,0]$.

Assuming that a given printer can produce S possible output states/drops with absorptance levels $\alpha_1, \alpha_2, \ldots, \alpha_s$ at every PEL location. Then, $a_i$ represents the amount of change in the gray level for toggle as: $a_i = g_{new}[m_i, n_i] - g_{old}[m_i, n_i]$. A swap between pixels i and j is equivalent to two toggles with $g_{new}[m_j, n_j] = g_{old}[m_i, n_i]$ and $g_{new}[m_i, n_i] = g_{old}[m_j, n_j]$. Thus, the amount of change in the gray level for swap is represented as $a_i = g_{old}[m_j, n_j] - g_{old}[m_i, n_i]$ and $a_j = g_{old}[m_i, n_i] - g_{old}[m_j, n_j]$. Then $a_j = -a_i$ except for $j=0$ (e.g., toggle, $a_0=0$).

Figure 3:
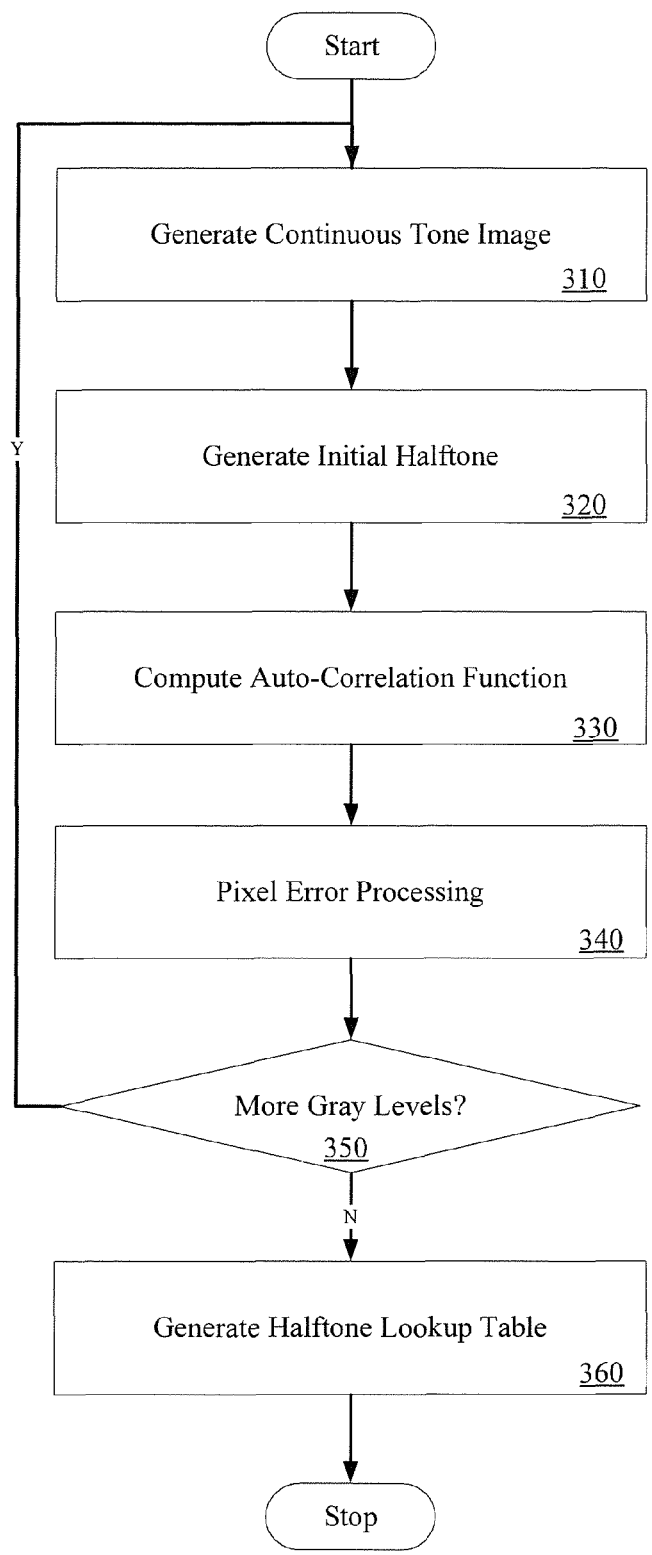
FIG. 3 is a flow diagram illustrating one embodiment of a multi-bit screening process.

FIG. 3 is a flow diagram illustrating one embodiment of a multi-bit screening process using the DMSSA based on $a_i$ and $a_j$. At processing block 310, a CTI is generated of size N×N with $f_\eta(m,n) = \eta$, where $\eta$ is the gray level=0, 1 $C_i$, 2 $C_i$, ..., $C_i$ $C_i$. Assuming an eight bit screen design, $C_i$ would be equal to 255. At processing block 320, an initial halftone image is generated for gray level 0 with all pixel values set to minimum absorptance level i.e. $\alpha_1$ (e.g., g of size N×N with $g_{0-initial}(m,n)=0$). At processing block 330, the auto-correlation function $c \widetilde{pp} [m,n]$ is computed. At processing block 340, pixel error processing is performed.

Figure 4:
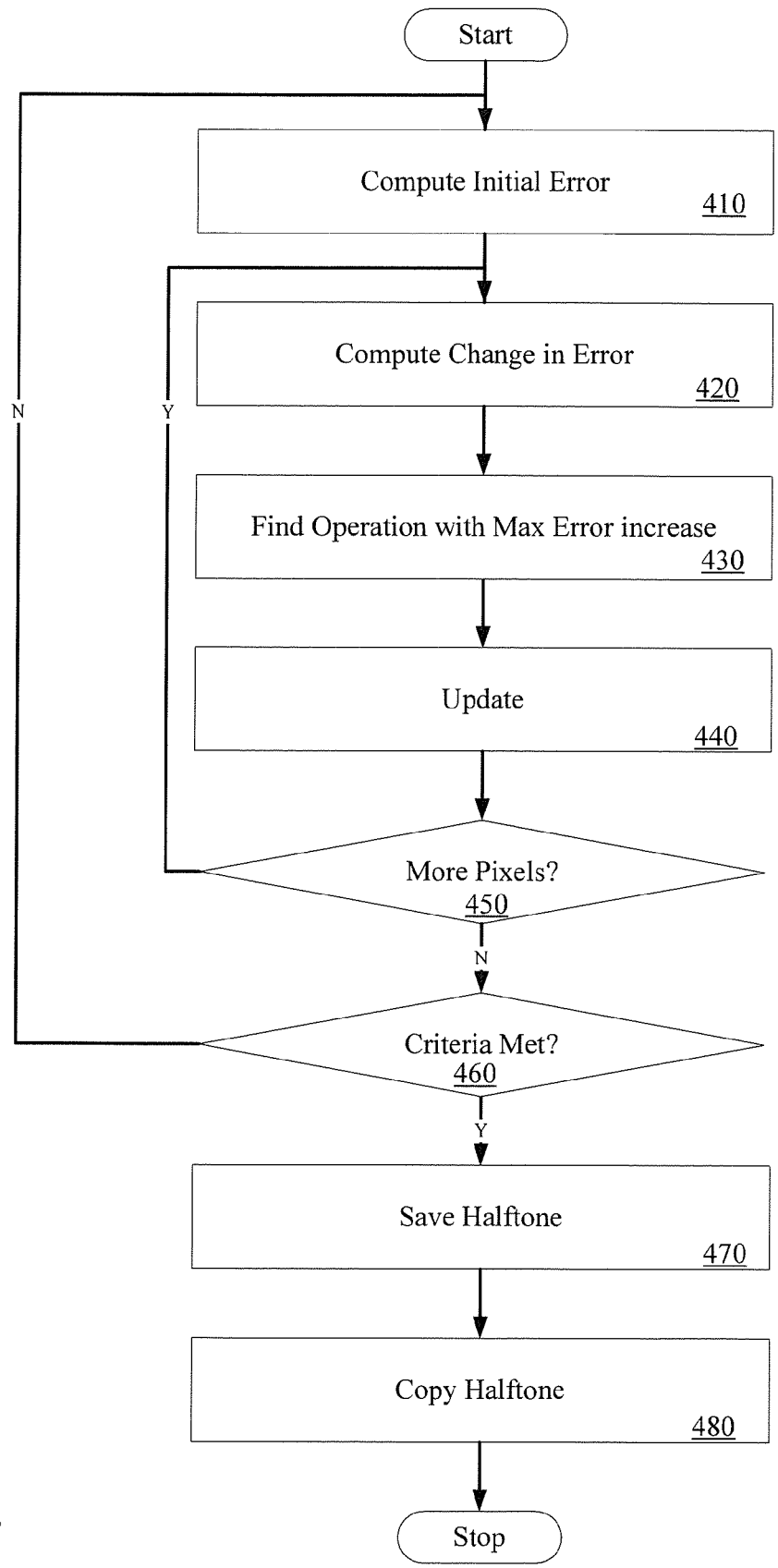
FIG. 4 is a flow diagram illustrating a further of embodiment of a multi-bit screening process.

FIG. 4 is a flow diagram illustrating one embodiment of performing pixel error processing. At processing block 410, the initial error $c \widetilde{pe} [m,n]$ between $f_\eta(m,n)$ and $g_{\eta-initial}(m,n)$ is computed. At processing block 420, a change in $c \widetilde{pe} [m,n]$ is computed for a pixel. The change in $c\widetilde{pe}$ [m,n] is computed by toggling pixel $g_{\eta\text{-}initial}$(m,n) with all the possible output states αs and swapping pixel $g_{\eta\text{-}initial}$(m,n) with all of the neighbors.

In one embodiment, both toggle and swap operations are performed only at locations that satisfy the stacking constraint. In such an embodiment, the stacking constraint specifies that output states for each pixel of the array are the same or higher relative to the output states for the halftone patterns for gray levels lower than the current levels. Output states increase until they reach the maximum output state, at which time they remain the same for all higher gray levels.

At processing block 430, the operation with maximum error decrease in Δε is found for that pixel location. If there is no change in the error, then the next pixel is processed. At processing block 440, $c\widetilde{pe}$ [m,n] and $g_{\eta\text{-}initial}$(m,n) are updated reflecting the accepted change: $c\widetilde{pe}$ [m,n]'= $c\widetilde{pe}$ [m,n]+$a_i c\widetilde{pp}$ [m−$m_i$,n−$n_i$]. At decision block 450, it is determined whether there are one or more additional pixels to process. If additional pixels are to be processed, the next pixel is processed according to processing blocks 420-440, described above.

However, if no more pixels need to be processed, it is determined whether an end criteria has been met, decision block 460. In one embodiment, the criteria have been met when no significant decrease in error is observed. At processing block 470, the gray level $g_{\eta\text{-}initial}$ is saved as the final halftone ($g_\eta$) for gray level η. At processing block 480, the saved halftone ($g_\eta$) is copied so that it can be used as initial halftone image for the next gray level (e.g., $g_{\eta+1\text{-}initial}$).

Referring back to FIG. 3, it is determined, once the pixel error processing has been performed for all pixels of the gray level, whether there are one or more additional gray levels to process, decision block 350. If there are additional gray levels to process, control is returned to processing block 340 where the next gray level is processed.

When the next gray level is selected at decision block 350, the CTI is updated to $f_{n+1}$(m,n)=η+1 at block 310, and the initial HTI $g_{\eta+1\text{-}initial}=g_\eta$ at block 320 and processed through pixel error processing block 340.

If no additional gray tones are available to process, a multi-bit halftone screen or LUT is created that includes values generated from the DMSSA algorithm. The halftone LUT is constructed from the resulting DMSSA patterns for each gray level.

Figure 6:
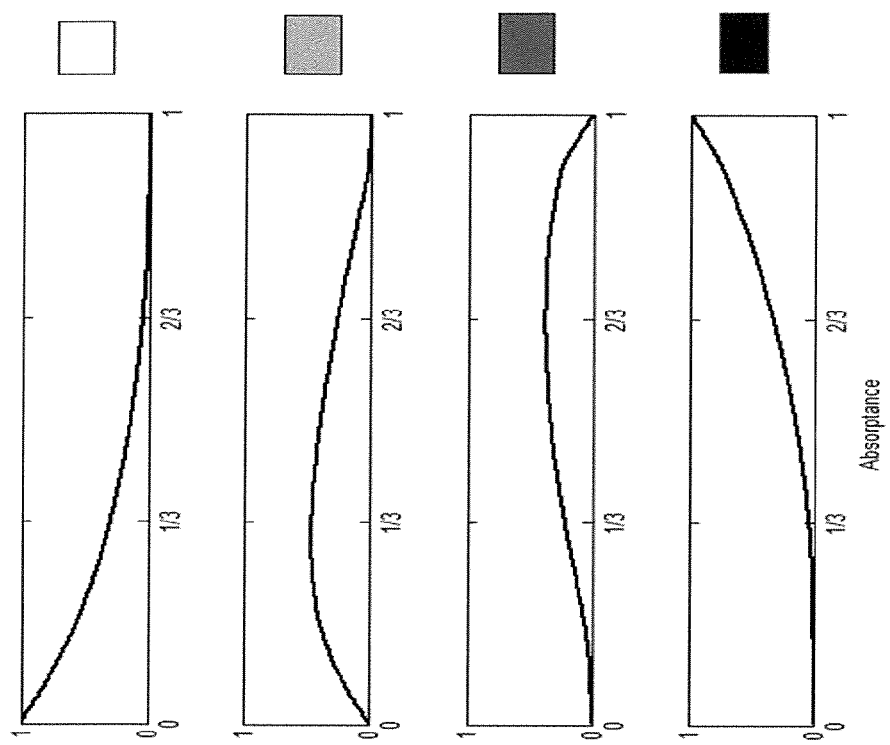
FIG. 6 illustrates one embodiment of calculated fraction of drop sizes in a multi-bit mask.
Figure 5:
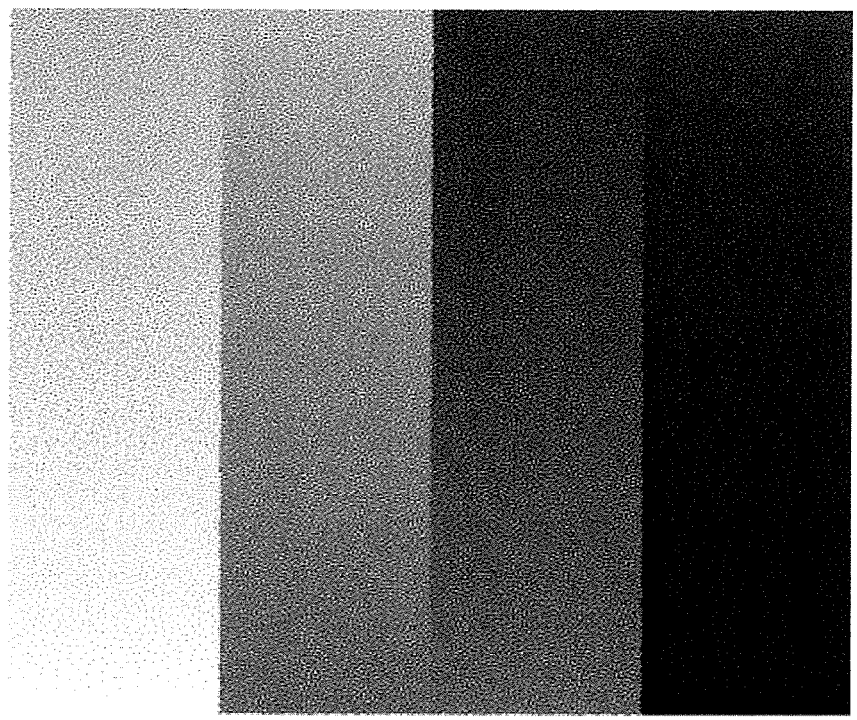
FIG. 5 illustrates one embodiment of a ramp halftone.

FIG. 5 illustrates one embodiment of a ramp halftoned using the DMSSA, while FIG. 6 illustrates one embodiment of the calculated fraction of drop sizes in a multi-bit mask created using the DMSSA with 0, 1/3, 2/3 and 1 absorptance values.

Figure 7:
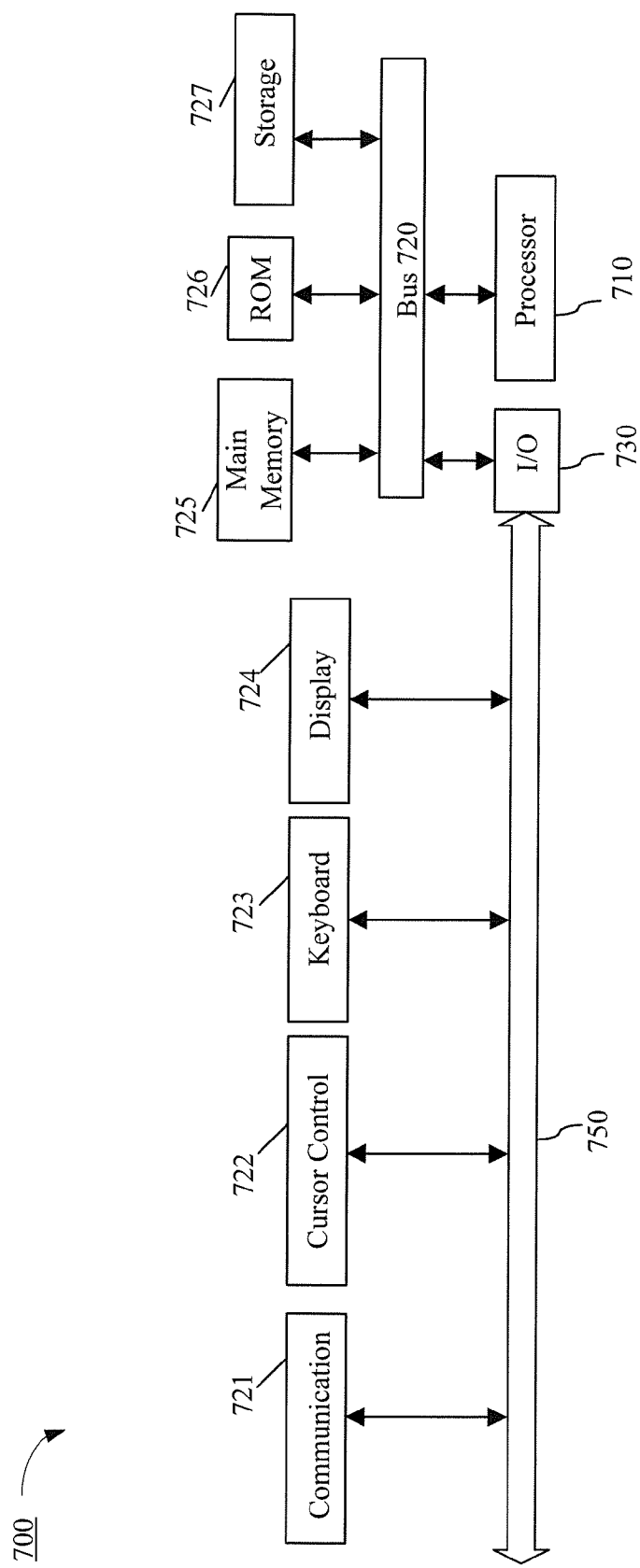
FIG. 7 illustrates one embodiment of a computer system.

FIG. 7 illustrates a computer system 700 on which print controller 140 and/or host system 110 may be implemented. Computer system 700 includes a system bus 720 for communicating information, and a processor 710 coupled to bus 720 for processing information.

Computer system 700 further comprises a random access memory (RAM) or other dynamic storage device 725 (referred to herein as main memory), coupled to bus 720 for storing information and instructions to be executed by processor 710. Main memory 725 also may be used for storing temporary variables or other intermediate information during execution of instructions by processor 710. Computer system 700 also may include a read only memory (ROM) and or other static storage device 726 coupled to bus 720 for storing static information and instructions used by processor 710.

A data storage device 725 such as a magnetic disk or optical disc and its corresponding drive may also be coupled to computer system 700 for storing information and instructions. Computer system 700 can also be coupled to a second I/O bus 750 via an I/O interface 730. A plurality of I/O devices may be coupled to I/O bus 750, including a display device 724, an input device (e.g., an alphanumeric input device 723 and or a cursor control device 722). The communication device 721 is for accessing other computers (servers or clients). The communication device 721 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. An article of manufacture comprising a non-transitory machine-readable medium including data that, when accessed by a machine, cause the machine to perform operations comprising:
  generating a Continuous Tone Image (CTI) with all pixel values same as a first gray level;
  generating an initial Half Tone Image (HTI) with all pixel values equal to minimum absorptance level; and
  computing a change in pixel error for a first pixel by:
    toggling the first pixel with all possible output states as long as the result of the toggling of the first pixel satisfies a stacking constraint; and
    swapping the first pixel with all neighbor pixels as long as the result of the swapping of the first pixel satisfies the stacking constraint, wherein the stacking constraint specifies output states for each pixel of an array that are the same or higher relative to output states for halftone patterns for gray levels lower than current levels; and
  finding an operation with maximum error decrease for the first pixel.

2. The article of manufacture of claim 1 comprising a machine-readable medium including data that, when accessed by a machine, further cause the machine to perform operations computing a change in pixel error for a second pixel if the toggle or swap operation at first pixel does not satisfy the stacking constraint.

3. The article of manufacture of claim 1 comprising a machine-readable medium including data that, when accessed by a machine, further cause the machine to perform computing a change in pixel error for a second pixel if no error decrease is found for the first pixel.

4. The article of manufacture of claim 1 comprising a machine-readable medium including data that, when accessed by a machine, further cause the machine to perform updating the HTI and the change in pixel error for the first pixel.

5. The article of manufacture of claim 4 comprising a machine-readable medium including data that, when accessed by a machine, further cause the machine to perform operations comprising:
   determining if there are additional pixels to process upon updating the HTI and the change in pixel error for the first pixel; and
   determining if an end criteria has been met upon determining that there are no additional pixels to process.

6. The article of manufacture of claim 5 comprising a machine-readable medium including data that, when accessed by a machine, further cause the machine to perform operations comprising:
   computing a change in pixel error for a second pixel if there are additional pixels to process;
   finding an operation with maximum error decrease for the second pixel if the operation at second pixel satisfies the stacking constraint; and
   updating the HTI and the change in pixel error for the second pixel.

7. The article of manufacture of claim 5 comprising a machine-readable medium including data that, when accessed by a machine, further cause the machine to perform operations comprising computing a change in pixel error for the first pixel if the end criteria has not been met.

8. The article of manufacture of claim 5 comprising a machine-readable medium including data that, when accessed by a machine, further cause the machine to perform operations comprising;
   saving the updated HTI as a final halftone screen for that gray level if the end criteria has been met;
   copying the saved final halftone screen as an initial HTI for the next gray level; and
   updating the CTI pixel values with next gray level till the final gray value is reached.

9. The article of manufacture of claim 8 wherein the end criteria has been met when no significant decrease in error is observed.

10. The article of manufacture of claim 1 comprising a machine-readable medium including data that, when accessed by a machine, further cause the machine to perform operations comprising computing an initial change in pixel error for the first pixel.

11. A system comprising:
   generating a Continuous Tone Image (CTI) with all pixel values same as a first gray level and an initial Half Tone Image (HTI) with all pixel values equal to minimum absorptance level;
   a processor to compute a change in pixel error for a first pixel by toggling the first pixel with all possible output states as long as the result of the toggling of the first pixel satisfies the stacking constraint; and swapping the first pixel with all neighbor pixels as long as the result of the swapping of the first pixel satisfies a stacking constraint, and computing an operation with maximum error decrease for the first pixel, wherein the stacking constraint specifies output states for each pixel of an array that are the same or higher relative to output states for halftone patterns for gray levels lower than current levels.

12. The system of claim 11 wherein the processor computes a change in pixel error for a second pixel if the operation at first pixel does not satisfy the stacking constraint.

13. The system of claim 11 wherein the processor updates the HTI and the change in pixel error for the first pixel.

14. The system of claim 13 wherein the processor determines if there are additional pixels to process upon updating the HTI and the change in pixel error for the first pixel and determines if an end criteria has been met upon determining that there are no additional pixels to process.

15. The system of claim 14 wherein the processor computes a change in pixel error for a second pixel if there are additional pixels to process, finds an operation with maximum error decrease for the second pixel and updates the HTI and the change in pixel error for the second pixel.

16. The system of claim 15 wherein the processor computes a change in pixel error for the first pixel if the end criteria has not been met.

17. The system of claim 16 wherein the processor saves the updated HTI as a final halftone screen for that gray level if the end criteria has been met and copies the final halftone screen as an initial HTI for the next gray level and the updates the CTI pixel values with next gray level till the final gray value is reached.

* * * * *